US008611267B2

United States Patent
Kwon et al.

(10) Patent No.: US 8,611,267 B2
(45) Date of Patent: Dec. 17, 2013

(54) COMMUNICATION METHOD OF A TERMINAL AND AN ACCESS POINT FOR POWER SAVING

(75) Inventors: Ui Kun Kwon, Hwaseong-si (KR); Young Soo Kim, Seoul (KR); Patil Sandhya, Bangalore (IN); Shubhranshu Singh, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 13/043,634

(22) Filed: Mar. 9, 2011

(65) Prior Publication Data
US 2011/0249605 A1 Oct. 13, 2011

Related U.S. Application Data

(60) Provisional application No. 61/412,489, filed on Nov. 11, 2010.

(30) Foreign Application Priority Data

Mar. 9, 2010 (IN) .............................. 622/CHE/2010
Aug. 17, 2010 (IN) ............................ 2361/CHE/2010
Feb. 17, 2011 (KR) ........................ 10-2011-0014078

(51) Int. Cl.
*G08C 17/00* (2006.01)
*H04W 4/00* (2009.01)
*H04L 12/28* (2006.01)

(52) U.S. Cl.
USPC ............................ 370/311; 370/328; 370/389

(58) Field of Classification Search
None
See application file for complete search history.

(56) References Cited

U.S. PATENT DOCUMENTS

| 6,845,245 | B2 | 1/2005 | Hunzinger | |
|---|---|---|---|---|
| 7,707,286 | B2 | 4/2010 | Gundu et al. | |
| 2006/0045035 | A1* | 3/2006 | Liu | ............... 370/311 |
| 2006/0083233 | A1* | 4/2006 | Nishibayashi et al. | ....... 370/389 |
| 2006/0252443 | A1* | 11/2006 | Sammour et al. | ............. 455/518 |
| 2007/0298781 | A1 | 12/2007 | Jiang | |
| 2008/0076405 | A1 | 3/2008 | Jen | |
| 2010/0222055 | A1 | 9/2010 | Cho et al. | |

FOREIGN PATENT DOCUMENTS

| KR | 10-2005-0117349 | 12/2005 |
|---|---|---|
| KR | 10-2009-0035380 | 4/2009 |
| KR | 10-2009-0111434 | 10/2009 |
| KR | 10-2010-0008232 | 1/2010 |
| KR | 10-2010-0063271 | 6/2010 |

* cited by examiner

*Primary Examiner* — Faruk Hamza
*Assistant Examiner* — Diane Lo
(74) *Attorney, Agent, or Firm* — NSIP Law

(57) ABSTRACT

Provided is a communication method of an access point and a terminal that may decrease power consumption by changing an operation state of a terminal from an awake state to a sleep state when there is no stream to be transmitted to the terminal during a transmission opportunity (TXOP).

18 Claims, 6 Drawing Sheets

COMMUNICATION METHOD OF A TERMINAL AND AN ACCESS POINT FOR POWER SAVING

CROSS-REFERENCE TO RELATED APPLICATION(S)

This application claims the benefit under 35 U.S.C. §119(e) of U.S. Provisional Application No. 61/412,489, filed on Nov. 11, 2010, in the U.S. Patent and Trademark Office, and the benefit under 35 U.S.C. §119(a) of India Patent Application No. 622/CHE/2010, filed on Mar. 9, 2010, and No. 2361/CHE/2010, filed in Aug. 17, 2010, both of which were filed in the Intellectual Property Office of India, and Korean Patent Application No. 10-2011-0014078, filed on Feb. 17, 2011, in the Korean Intellectual Property Office, the entire disclosures of which are incorporated herein by reference for all purposes.

BACKGROUND

1. Field

The following description relates to a communication method of a terminal and an access point for multi-user power saving.

2. Description of Related Art

Mobile terminals such as smart phones allow a user to simultaneously perform a variety of functions, for example, making a call, playing a motion picture, playing back a music file, viewing a digital multimedia broadcasting (DMB), a digital camera function, Bluetooth, wireless Internet access, and the like, using a single terminal.

In addition, as the data rate of a mobile communication networks, Bluetooth, wireless Internet, and the like, increases, power consumption of a terminal may also increase. Accordingly, there is a desire for a communication method that may employ a high capacity battery for a terminal, and may decrease power consumption by the terminal.

SUMMARY

In one general aspect, there is provided a communication method of a terminal in a wireless network comprising an access point and a plurality of terminals, the method including setting a power management mode to a power saving mode during a transmission opportunity (TXOP) in which the access point obtains the TXOP with respect to a channel and simultaneously transmits data streams to a group comprising the plurality of terminals, and determining an operation state of the terminal as one of an awake state and a sleep state by determining whether a predetermined criterion is satisfied based on information received from the access point.

The determining of the operation state may comprise determining whether the predetermined criterion is satisfied based on information received from the access point, and changing the operation state of the corresponding terminal from the awake state to the sleep state when the predetermined criterion is satisfied.

The information received from the access point may comprise at least one of a group identifier (ID) of a group comprising the terminal, information indicating whether a data stream corresponding to the terminal is going to be transmitted from the access point during the TXOP, and information indicating whether there is an additional data stream to be transmitted to the terminal.

The predetermined criterion may comprise a first criterion, a second criterion, and a third criterion, and when the group ID indicates that the terminal is not a member of the group, the first criterion is satisfied, when the group ID indicates that the terminal is a member of the group, and when a data stream corresponding to the terminal is not going to be transmitted from the access point during the TXOP, the second criterion is satisfied, and when the corresponding terminal receives an indicator indicating that an additional data stream corresponding to the terminal is not going to be transmitted during the TXOP, the third criterion is satisfied.

The method may further comprise receiving information associated with the TXOP duration from the access point.

The method may further comprise transmitting information associated with the operation state of the terminal to the access point using a control field of a media access control (MAC) header.

The method may further comprise notifying the access point of information about whether the terminal has a capability of supporting the power saving mode.

In another aspect, there is provided a communication method of an access point in a wireless network comprising the access point and a plurality of terminals, the method including transmitting information associated with a transmission opportunity (TXOP) duration in which the access point obtains a TXOP with respect to a channel and simultaneously transmits data streams to a group comprising the plurality of terminals, in response to at least one terminal setting a power management mode to a power saving mode during the TXOP, transmitting information to be used by the at least one terminal to determine an operation state in a power saving mode as one of an awake state and a sleep state, and simultaneously transmitting the data streams to terminals set to the awake state in the TXOP duration, based on an operation state of each of the terminals.

The method may further comprise transmitting, to the terminals, information about whether the access point is capable of supporting the power saving mode, and information associated with a support capability of the access point for the power saving mode.

The method may further comprise generating a group with respect to the terminals based on information comprising a quality of service (QoS) between the terminals and a channel condition, and notifying the terminals of information associated with a member of the group.

The method may further comprise regrouping the plurality of terminals and a predetermined terminal in response to a notification of the predetermined terminal when the predetermined terminal enters the power saving mode.

The method may further comprise in response to a predetermined terminal entering sleep mode, replacing, from the group, the predetermined terminal with another terminal based on data to be transmitted, notifying the predetermined terminal of information associated with a member of the group updated by the replacement.

The simultaneously transmitting of the data streams may comprise buffering the data streams with respect to terminals set to the sleep state from among the plurality of terminals during the TXOP duration, based on the operation state of each of the terminals.

The method may further comprise, in response to an operation state of the terminal being changed from the sleep state to the awake state, transmitting the buffered data streams to a terminal that was in the sleep state.

The information used by each of the at least one terminal to determine the operation state in the power saving mode as one of the awake state and the sleep state may comprise at least one of a group identifier (ID) of a group comprising each of the terminals, information indicating whether there is a data stream to be transmitted to each of the respective terminals from the access point during the TXOP duration, and information indicating whether there is an additional data stream to be transmitted to each of the respective terminals.

The method may further comprise suspending a transmission of a data stream corresponding to a terminal satisfying a predetermined criterion, so that the terminal satisfying the predetermined criterion maintains the operation state as the sleep state for the remainder of the TXOP duration.

The predetermined criterion may comprise a first criterion, a second criterion, and a third criterion, and when a group ID of the group indicates that a terminal is not a member of the group, the first criterion is satisfied, when the group ID of the group indicates that the corresponding terminal is the member of the group, and when a data stream corresponding to the terminal is not going to be transmitted from the access point during the TXOP, the second criterion is satisfied, and when the corresponding terminal receives an indicator indicating that an additional data stream corresponding to the terminal is not going to be transmitted during the TXOP, the third criterion is satisfied.

In another aspect, there is provided a computer-readable storage medium comprising program instructions to cause a computer to implement a method including setting a power management mode to a power saving mode during a transmission opportunity (TXOP) in which the access point obtains the TXOP with respect to a channel and simultaneously transmits data streams to a group comprising the plurality of terminals, and determining an operation state of the terminal as one of an awake state and a sleep state by determining whether a predetermined criterion is satisfied based on information received from the access point.

Other features and aspects may be apparent from the following detailed description, the drawings, and the claims.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, description of well-known functions and constructions may be omitted for increased clarity and conciseness.

In certain aspects, a terminal may be a single user multiple input multiple output (SU-MIMO) terminal, or a multi-user multiple input multiple output (MU-MIMO) terminal. For example, the terminal may support various protocol, for example, an IEEE 802.11 protocol such as IEEE 802.11ac, IEEE 802.11n, and the like.

Figure 1:
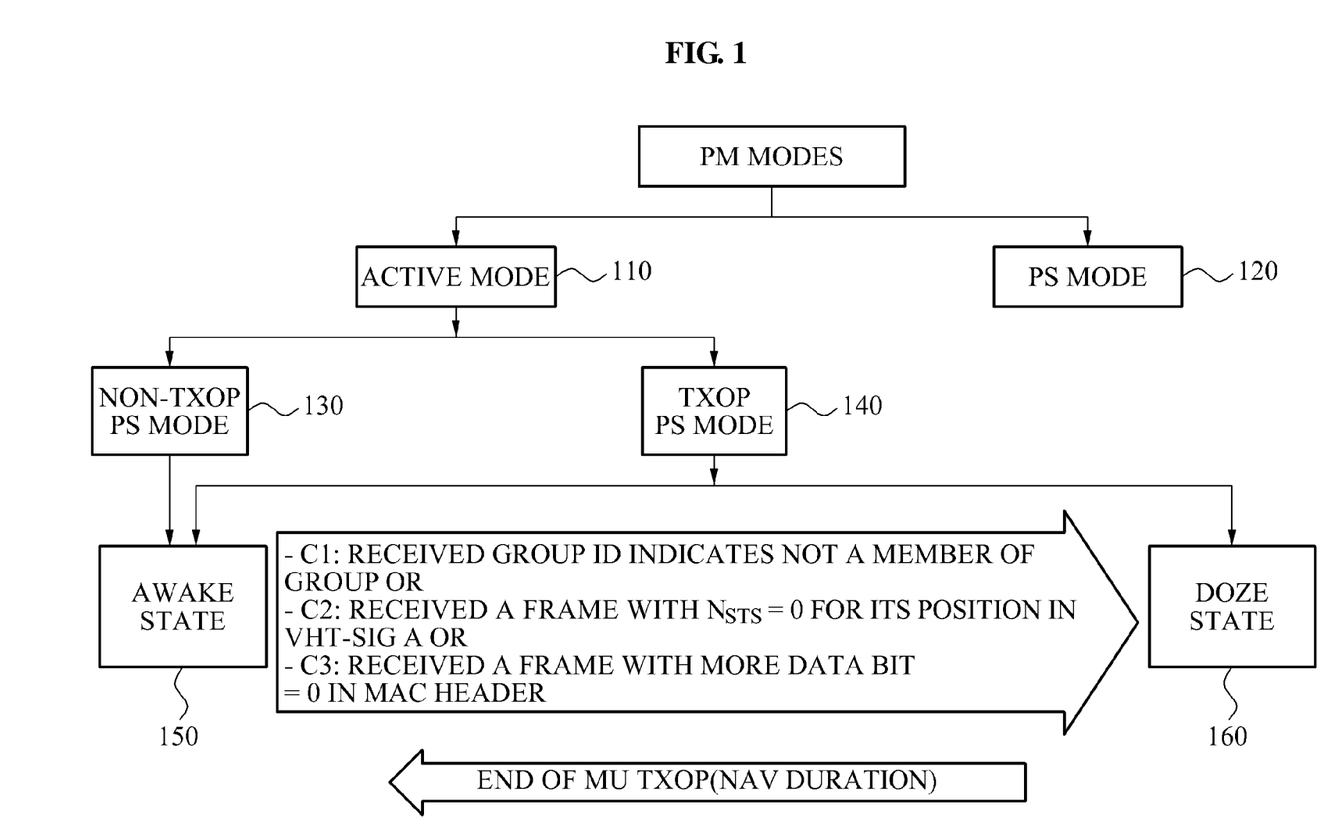
FIG. 1 is a diagram illustrating an example of an operation state of a terminal in a transmission opportunity (TXOP) power saving mode.

FIG. 1 illustrates an example of an operation state of a terminal in a transmission opportunity (TXOP) power saving mode.

At least one terminal, for example, a reception apparatus or a station receiving data from an access point may maintain an active mode in order to receive a packet or a frame transmitted to the at least one terminal. The at least one terminal may remain in the active mode in order to overhear a packet to be transmitted to another terminal.

If there is no transmission of data corresponding to the terminal, or when the transmission of data to the terminal is completed, it is possible to save a receive standby time and a receive standby power by adjusting an operation mode or a power management mode of the terminal. For example, the terminal may switch from an awake state to a sleep or doze state to conserve time and power.

Referring to FIG. 1, a power management mode of a terminal includes an active mode 110 and a power saving (PS) mode 120. While in the active mode 110, the terminal may enter into two power management modes, a non-power save mode (non-TXOP PS mode) in which the terminal stays awake, and a power save mode (TXOP PS mode) in which the terminal may switch between an awake state 150 and doze state 160.

The active mode 110 is a state in which the terminal may be continuously operating to transmit and receive data to and from an access point. The PS mode 120 is a state, for example, an idle state in which the terminal does not operate or a state in which the terminal reduces overall power consumption. A terminal operating in the PS mode 120 may transmit information associated with the operation state of the terminal to the access point using one or more bits of a control field of a media access control (MAC) header.

In this example, terminals operating in the active mode 110 may be divided into terminals operating in a non-TXOP PS mode 130 and terminals operating in a TXOP PS mode 140.

The terminals operating in the non-TXOP PS mode 130 may maintain an awake state without a separate operation for the power saving. Accordingly, the terminals operating in the non-TXOP PS mode 130 may continuously consume the power for a receive standby time that is used to wait for receiving a packet to be transmitted to corresponding terminals.

The terminals operating in the TXOP PS mode 140 may change an operation state to an awake state 150 or a sleep state such as a doze state 160, based on whether a predetermined criterion is satisfied.

For example, the predetermined criterion may include a first criterion, a second criterion, and a third criterion. If any one of the criterion is satisfied, a terminal may switch from the awake state 150 to the doze state 160 for the remainder of the TXOP of the access point.

For example, the first criterion may be satisfied if a group identifier (ID) of a group indicates that a terminal is not a member of the group.

As another example, the second criterion may be satisfied if the group ID of the group indicates that the terminal is the member of the group, however, a data stream corresponding to the terminal is not going to be transmitted from the access point during the TXOP. In this example, an access point may inform the terminal that a data stream corresponding to the terminal is not going to be transmitted from the access point during the TXOP by setting a number of state time space ($N_{STS}$) included in a very high throughput SIGnal (VHT-SIG) field of a frame corresponding to the terminal to a predetermined value, for example, a value of '0'.

As another example, the third criterion may be satisfied if the group ID of the group indicates the terminal is a member of the group, the terminal receives a data stream during the TXOP, however, the terminal receives an indicator indicating that there is no additional data stream to be sent to the corresponding terminal during the TXOP duration. That is, the terminal receives an indicator indicating that the data stream sent to the terminal has been completed In this example, the indicator indicating that there is no additional data stream to be transmitted to the terminal may be a more data bit (MDB) included in a MAC header of a frame received by the terminal from the access point that is set to a particular value, for example, a value of '0'. That is, the MDB included in the MAC header of the frame may be set to a particular value to indicate that transmission of the data stream corresponding to the terminal is completed for the remainder of the TXOP.

A terminal satisfying the aforementioned criterion may save the receive standby power for the remainder of the TXOP by changing an operation state of the terminal from the awake state 150 to the sleep state such as a doze state 160. The TXOP duration may indicate a time duration in which the access point simultaneously transmits data streams to a group of terminals over a respective channel.

In various aspects, the terminal operating in the TXOP PS mode 140 may save the receive standby power and decrease power consumption of the terminal by changing the operation state during the TXOP based on the predetermined criterion.

Hereinafter, the TXOP PS mode 140 may be referred to as a power saving mode.

Figure 2:
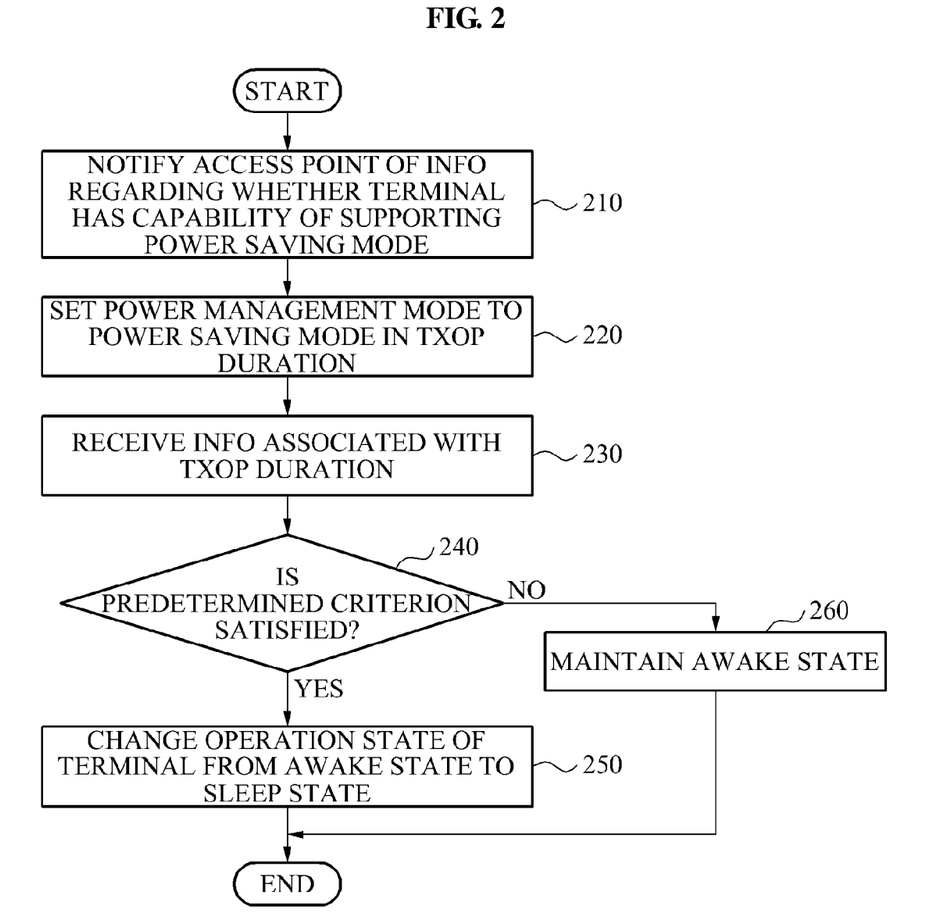
FIG. 2 is a flowchart illustrating an example of a communication method of a terminal.

FIG. 2 illustrates an example of a communication method of a terminal.

The communication method of the terminal in a wireless network including an access point and one or more terminals is described with reference to FIG. 2.

In 210, the terminal notifies the access point of information about whether the terminal has a capability of supporting a power saving mode.

For example, to notify the access point about whether the terminal has the capability of supporting the power saving mode, the terminal may use a single bit of a capability/support element of an association request frame that is to be transmitted while the terminal is performing an association with the access point. Examples of the bit of the capability/support element are shown in Table 1.

In 220, the terminal sets a power management mode to the power saving mode during a TXOP. Prior to entering the TXOP, the terminal may determine the power management mode of the terminal as is described herein with reference to FIG. 1.

The TXOP duration may correspond to a time duration in which the access point may simultaneously transmit data streams to a group including the plurality of terminals via a respective channel. The TXOP duration may correspond to a network allocation vector (NAV) duration.

The terminal may determine an operation state of the terminal in the power saving mode (i.e. doze/sleep state) by determining whether a predetermined criterion is satisfied, based on information received from the access point.

The operation state of the terminal in the power saving mode may correspond to one of an awake state and a sleep state.

Information received from the access point may be used when the terminal determines the operation state of the terminal as the power saving mode. For example, information received from the access point may include at least one of a group ID of a group that indicates that the terminal is a member of the group that may receive data from the access point, information indicating whether a data stream corresponding to the terminal is to be transmitted from the access point during the TXOP, and information indicating whether an there is an additional data stream to be transmitted to the terminal during the TXOP.

Whether the data stream corresponding to the terminal is going to be transmitted from the access point during the TXOP may be verified based on an $N_{STS}$ field included in a VHT-SIG-A field. The terminal may verify whether there is a data stream to be transmitted to the terminal from the access point, based on the $N_{STS}$.

For example, the $N_{STS}$ may be set to '0' to indicate that there is no data stream to be transmitted to the terminal from the access point during the TXOP. As another example, the $N_{STS}$ may be set to a value other than '0' to indicate that a data stream is to be transmitted to the terminal from the access point during the TXOP.

Whether there is an additional data stream to be transmitted to the terminal may be verified using, for example, an MDB of a control field. For example, the MDB may be set to '0' to indicate that there is no additional data to be transmitted to the terminal during the TXOP. As another example, the MDB may be set to '1' to indicate that there is an additional data stream to be transmitted to the terminal during the TXOP.

In 230, the terminal receives information associated with the TXOP duration from the access point.

For example, the terminal may verify information associated with the TXOP duration by checking a duration field of a request to send (RTS) frame received from the access point. In this example, an RTS/clear to send (CTS) frame may be initially transmitted before the TXOP duration starts, and the terminal may receive information associated with the TXOP duration.

To determine the TXOP duration, the terminal may use the RTS/CTS frame, a self CTS frame, a duration field, and the like.

A duration field of the RTS/CTS frame may correspond to a TXOP time period.

For example, the self CTS frame may be used for a downlink MU-MIMO. The access point may transmit the self CTS frame prior to transmitting data frames to the terminals included in the group. A duration bit of the self CTS frame may indicate a TXOP duration.

As another example, a duration value may be expressed by one or more bits of a VHT-SIG-A field of a preamble.

In 240, the terminal determines whether a predetermined criterion is satisfied based on information received from the access point.

In response to the predetermined criterion being satisfied, the terminal changes the operation state of the terminal from the awake state to the sleep state for the remainder of the TXOP, in 250. After changing the operation state to the sleep state, the terminal may decrease power consumption such as the receive standby power consumption and the data receive power consumption by maintaining the sleep state for the remainder of the TXOP duration.

In response to the predetermined criterion not being satisfied, in 260 the terminal maintains the operation state of the terminal as the awake state during the TXOP.

The predetermined criterion may include, for example, a first criterion, a second criterion, and a third criterion as described with reference to FIG. 1.

When the group ID of the group indicates that the terminal is not a member of the group, the first criterion may be satisfied. For example, it may be assumed that the terminal is a terminal 4, and a group having a group ID of 'A' includes a terminal 1, a terminal 3, and a terminal 5. In this example, because terminal 4 is not included in the group A, the corresponding terminal is not a member of the group A. Accordingly, the first criterion may be satisfied.

When the group ID of the group indicates that the terminal is a member of the group, however, a data stream is not going to be transmitted to the terminal from the access point during the TXOP, the second criterion may be satisfied. In this example, the access point may indicate that there is no data stream to be transmitted to the terminal from the access point during the TXOP based on a value of an $N_{STS}$ field included in a VHT-SIG-A field of a frame.

As another example, the third criterion may be satisfied if the group ID of the group indicates the terminal is a member of the group, the terminal receives a data stream during the TXOP, but the corresponding terminal receives an indicator indicating that an there is no additional data stream to be transmitted to the terminal during the remainder of the TXOP, the third criterion may be satisfied. In this example, the indicator indicating that there is no additional data stream to be transmitted to the terminal may be an MDB.

Figure 3:
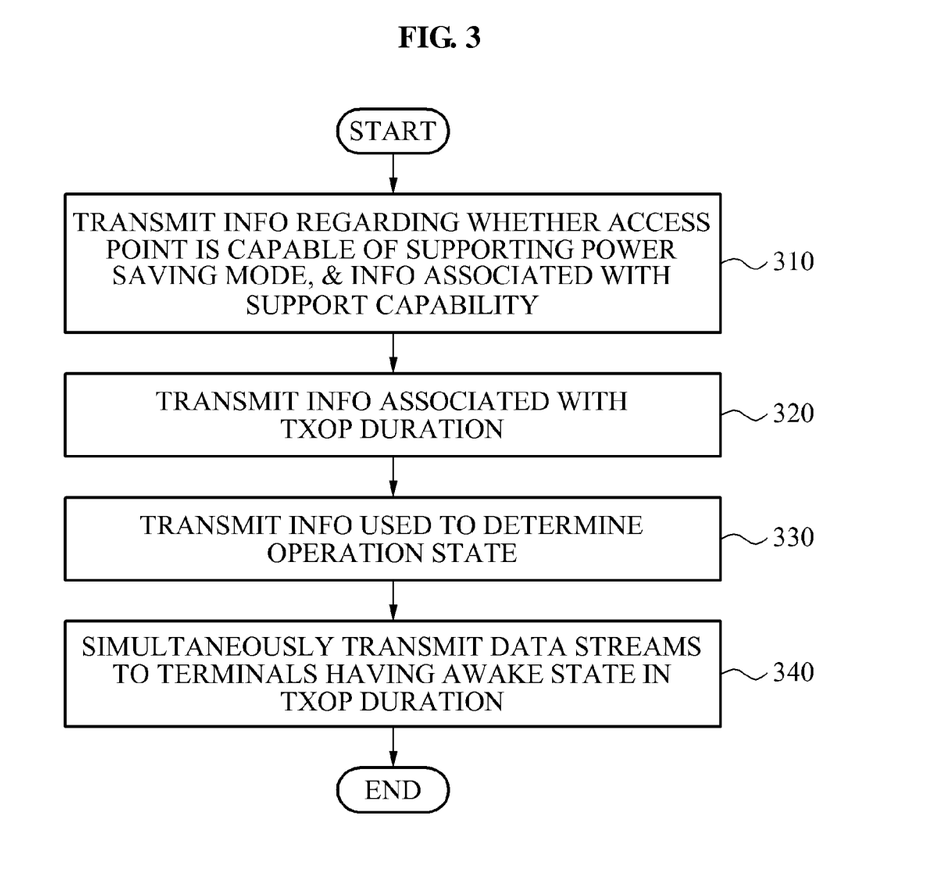
FIG. 3 is a flowchart illustrating an example of a communication method of an access point.

FIG. 3 illustrates an example of a communication method of an access point.

The communication method of the access point in a wireless network including the access point and one or more terminals is described with reference to FIG. 3.

The access point may transmit a frame to a terminal, or may buffer the frame during a TXOP. Accordingly, the access point may determine an operation of the access point by receiving information associated with a current operation state of the corresponding terminal through association with the terminal.

In 310, the access point transmits, to the one or more terminals, information about whether the access point is capable of supporting the power saving mode and information associated with a support capability of the access point for the power saving mode.

For example, the access point may notify the terminal about whether the access point is capable of supporting the power saving mode and the support capability of the access point, for example, using an information element or a capability element of a probe response frame or a beacon frame.

In this example, whether the access point is capable of supporting the power saving mode may correspond to whether the access point is capable of performing association with a terminal operating in the power saving mode.

In 320, the access point transmits information associated with a TXOP duration to the terminals. The TXOP duration may correspond to a time duration in which the access point obtains a TXOP with respect to a channel and during which the access point may simultaneously transmit data streams to a group including the terminals.

The terminals may be made aware of information associated with the TXOP duration before entering the sleep state for the remainder of the TXOP duration. For example, the access point may transmit corresponding information to the terminals.

For example, the terminals may be made aware of information about whether there is an additional data stream to be transmitted to each of the terminals, that is, whether there is an additional data stream to be transmitted to each of the terminals during the remainder of the TXOP. Accordingly, the access point may provide, to the terminals, corresponding information, for example, information about whether there is an additional data stream to be transmitted to each of the terminals during the TXOP, using information used to determine the operation state.

In response to at least one terminal setting the power management mode to the power saving mode during the TXOP, the access point transmits information for the terminal to use to determine the operation state in the power saving mode, in 330. The operation state in the power saving mode may correspond to one of the awake state and the sleep state.

The information used when each of the at least one terminal determines the operation state in the power saving mode may include at least one of an ID of a group including each of the terminals, information indicating whether there is an additional data stream corresponding to each of the terminals to be transmitted from the access point during the TXOP, and information indicating whether there is an additional data stream to be transmitted to the corresponding terminals during the remainder of the TXOP.

Whether there is a data stream corresponding to each of the terminals to be transmitted from the access point during the TXOP may be verified from an $N_{STS}$ field included in a VHT-SIG-A field.

Whether there is an additional data stream corresponding to each of the terminals may be verified from an MDB of a control field.

In 340, the access point simultaneously transmits data streams to terminals having the awake state during the TXOP.

The access point may buffer the data streams corresponding to terminals having the sleep state among the plurality of terminals in the TXOP duration, based on the operation state of each of the terminals.

For example, the access point may not transmit a data stream corresponding to a terminal where that terminal has satisfied one of the predetermined criterion, so that the terminal satisfying the predetermined criterion may maintain the operation state to be in the sleep state for the remainder of the TXOP duration.

Whether the terminal satisfies the predetermined criterion may be determined based on information used to determine the operation state.

The predetermined criterion may include a first criterion, a second criterion, and a third criterion. Descriptions related thereto may refer to the descriptions described above with reference to FIGS. 1-2.

When an operation state of a terminal is changed from the sleep state to the awake state, the access point may transmit the buffered data stream to the terminal. For example, when the TXOP duration ends, the access point may automatically recognize that the operation state of the corresponding terminal is changed from the sleep state to the awake state.

As another example, the terminal may transmit a power save-poll message to the access point. The power save-poll message may be a message that the terminal in the sleep state transmits in order to notify the access point that the operation state of the terminal has changed from the sleep state to the awake state.

For example, a duration of a TXOP may be cut short, after a terminal has entered into a doze state or a sleep state. Therefore, the access point is capable of buffering data for the terminal until the duration of the TXOP is finished, or until the access point is notified by the terminal that the terminal is ready to receive the data.

For example, when the terminal desires to operate in the power saving mode, the terminal may transmit, the AP, a frame in which a power management mode is set to the power saving mode. The AP may transmit an ACK to the terminal in response to the frame.

In response, the AP transmits, to the terminal, information about the TXOP such as the Group ID, whether there is a data stream for the terminal, and whether there is an additional data stream for the terminal. The terminal may determine whether the predetermined criterion is satisfied based on the information. In this example, because the information is transmitted from the AP, the AP also may know whether the predetermined criterion is satisfied for each respective terminal.

Accordingly, even if the terminal does not transmit additional information that the terminal is going to enter into the sleep state, the AP may recognize that the terminal is going to enter into the seep state.

In a MU-MIMO 802.11 network, the access point may group, into a single group or a plurality of groups, terminals to which the access point is to simultaneously transmit data to. The access point may configure the single group or the plurality of groups with respect to the terminals based on a predetermined criterion, for example, a quality of service (QoS) requirement, a channel condition, and the like. The access point may notify the terminals of information associated with members of a group.

For example, 'simultaneously' transmitting the data streams may indicate that the data streams are simultaneously transmitted in a spatial aspect or are transmitted using an MU-MIMO) communication, and may not indicate that transmission of data streams corresponding to at least one terminal simultaneously starts and is simultaneously completed.

The access point may notify the terminals of information associated with members of the group using, for example, a management frame. For example, a group having a predetermined group ID may include a set of terminals included in a corresponding cell.

The access point may assign a group ID independently from a TXOP transmission, that is, a transmission of a data frame between TXOP durations, instead of in the TXOP duration.

In response to a predetermined terminal entering the sleep state of the power saving mode, the access point may replace, from the group, the predetermined terminal with another terminal based on data to be transmitted. In response, the access point may notify all of the terminals of information associated with the new member, that is, the terminal of the group updated by the replacement.

In response to the predetermined terminal notifying the access point that the predetermined terminal has entered or is entering the power saving mode, the access point may regroup the terminals and the predetermined terminal in response to the notification of the predetermined terminal.

The aforementioned regrouping may be useful when the predetermined operates in the power saving mode for at least one TXOP.

The regrouping enables the access point to transmit data to another terminal rather than to transmit a packet or a frame in which an $N_{STS}$ is set to '0' to a terminal that the access point has no need to transmit data.

For example, if the TXOP duration is truncated or otherwise shortened, the access point may buffer a frame for terminals entering the power saving mode for an amount of time remaining in the obtained TXOP duration.

Table 1 illustrates bits used for a control field and an information element for power saving according to various examples.

TABLE 1

| | Entity | number of bits | Description |
|---|---|---|---|
| 1 | Information element of information element field of beacon frame | 1 | '0': may be used to indicate that access point does not support power saving mode. '1': may be used to indicate that access point supports power saving mode. |
| 2 | Information element of capabilities/support field of association request frame | 1 | '0': may be used to indicate that terminal does not support power saving mode. '1': indicates that terminal supports power saving mode. |
| 3 | Control field of MAC header | 1 | '0': may be used to indicate that power management mode is not set to power saving mode. '1': may be used to indicate that power management mode is set to power saving mode. |

In Table 1, the power saving mode may indicate a downlink MU TXOP power saving mode.

Figure 4:
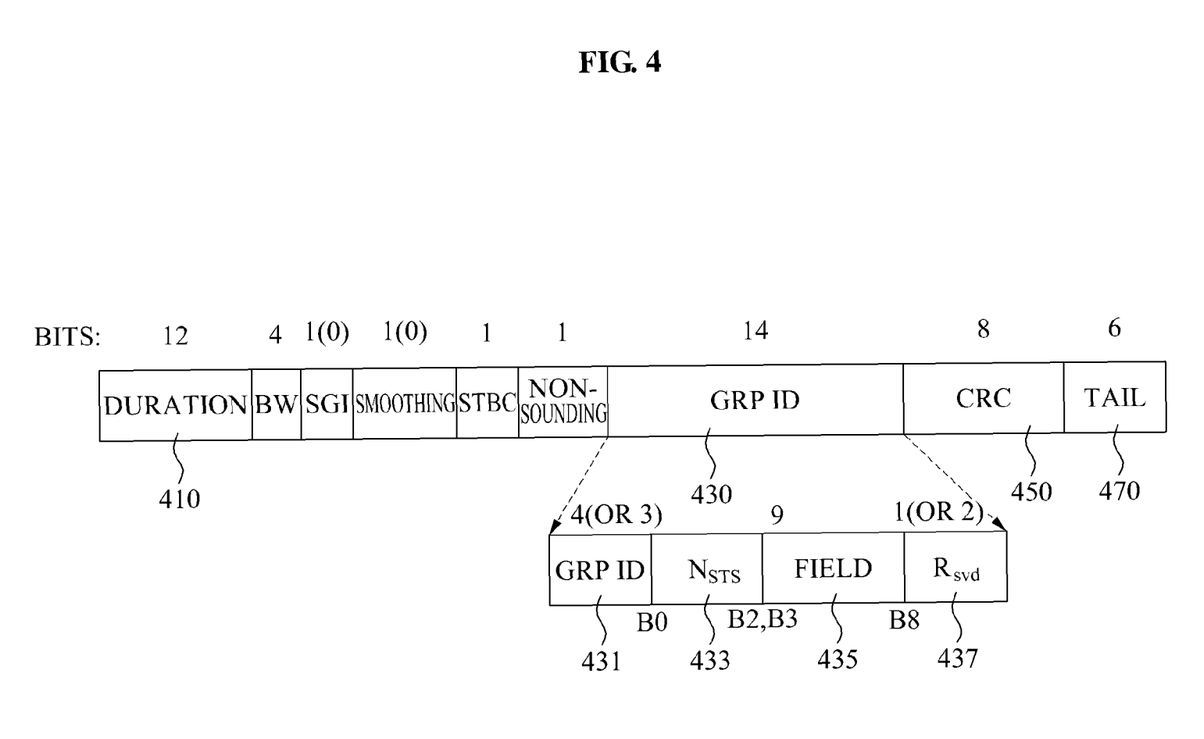
FIG. 4 is a diagram illustrating an example of a very high throughput signal (VHT-SIG) A field of an Institute of Electrical and Electronics Engineers (IEEE) 802.11 preamble.

FIG. 4 illustrates an example of a very high throughput signal (VHT-SIG) A field of an Institute of Electrical and Electronics Engineers (IEEE) 802.11 preamble.

Referring to FIG. 4, a duration field 410 may include 12 bits, and may include information associated with a TXOP duration, for example, a length of a TXOP duration and the like.

A group ID field 430 may include 14 bits, and may include group ID bits 431, $N_{STS}$ fields 433 and 435, and $R_{svd}$ bits 437.

The group ID bits 431 may include three bits or four bits, and may notify each of terminals of a group ID of a group including one or more terminals.

The $N_{STS}$ fields 433 and 435 may include nine bits, and may be used to verify whether there is a data stream to be transmitted to each of the terminals during the TXOP.

The $N_{STS}$ field 433 including lower three bits may indicate a number of space time streams that are to be transmitted to each of the respective terminals included in the group in a corresponding frame. When a terminal k is not a receiver of an MU-MIMO packet or a frame, the $N_{STS}$ field 433 may be expressed by $N_{STS}\_k$='0' with respect to the terminal k.

For example, it may be assumed that a group ID of a corresponding group is '1' and terminals A, B, C, and D are included in the corresponding group. When $N_{STS}$=(0, 2, 3, 1), it may indicate that, in a corresponding frame, zero space time streams are going to be transmitted to the terminal A, two space time streams are to be transmitted to the terminal B, three space time streams are to be transmitted to the terminal C, and a single space time stream is to be transmitted to the terminal D. In this example, $N_{STS}$=(0, 2, 3, 1) indicates that the corresponding frame is transmitted to the terminals B, C, and D that are members of the group having the group ID '1'.

The $N_{STS}$ field 435 including upper six bits may be reused when the group ID is '0'. The $N_{STS}$ field 435 may be used for power saving.

The $R_{svd}$ bits 437 may include a single bit. For example, if the $R_{svd}$ bits 437 is '1' and values of the $N_{STS}$ fields 433 and 435 are '0', this may indicate that data is absent in a data frame for a predetermined terminal included in a predetermined group. That is, it may indicate 'no data', and may indicate 'no more data' for a terminal for the remaining amount of time in the TXOP duration.

A cyclic redundancy check (CRC) field 450 may include eight bits, and may be used for an error detection to verify a reliability with respect to data of a corresponding frame.

A tail field 470 may include six bits, and may be added to an end of the corresponding frame.

Figure 5:
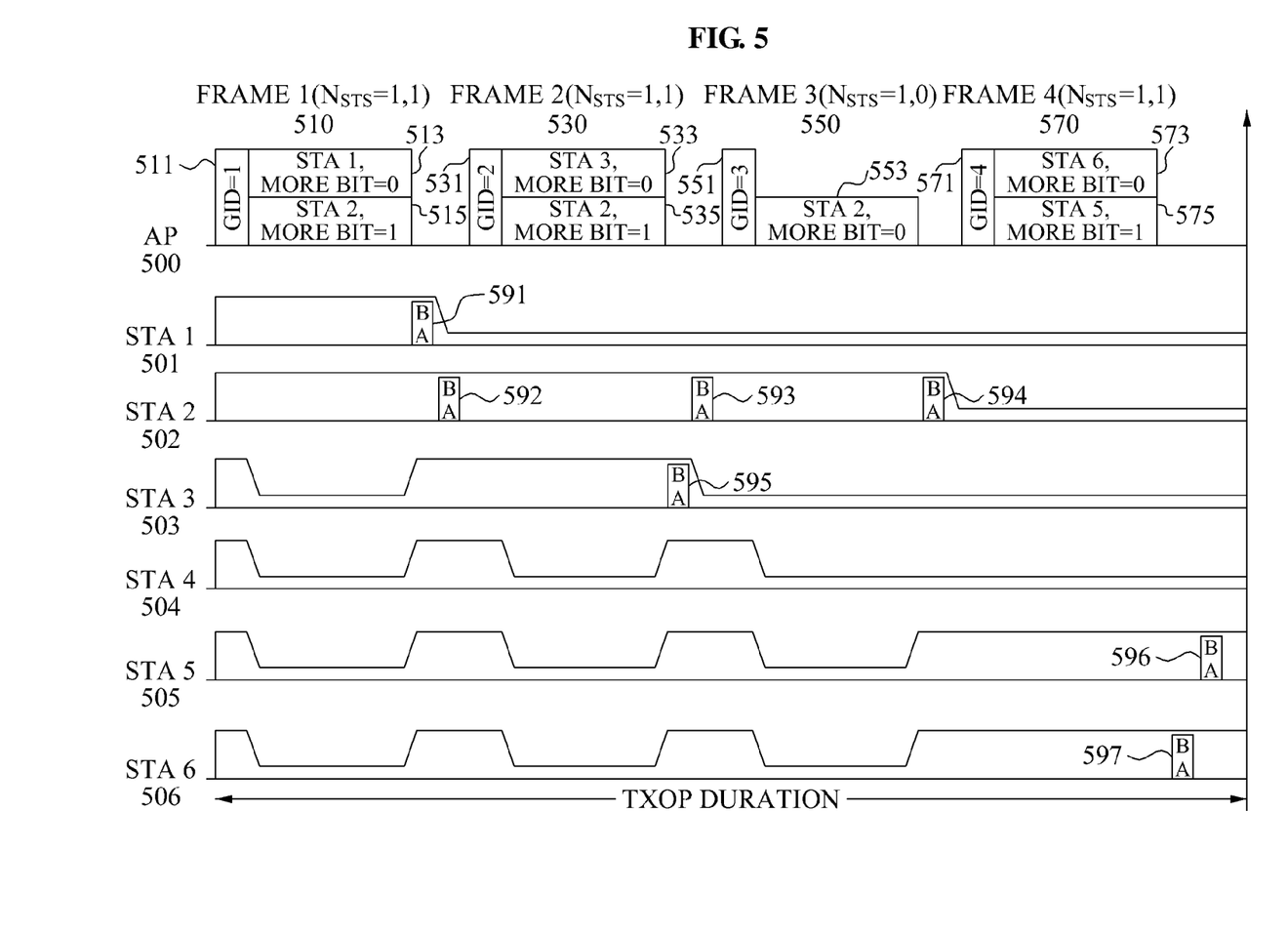
FIG. 5 is a diagram illustrating an example of an operation of each terminal based on a power saving mode and a group identifier (ID) of a group changed during a TXOP.

FIG. 5 illustrates an example of an operation of a plurality of terminals based on a power saving mode and a group ID of a group changed during a TXOP.

Hereinafter, STA may indicate, for example, a terminal, or a station, and AP may indicate, for example, an access point.

Referring to FIG. 5, an STA (1) 501, an STA (2) 502, an STA (3) 503, and an STA (4) 504 have a power management mode of '1' (i.e. TXOP PS mode 140 shown in FIG. 1), and an STA (5) 505 and an STA (6) 506 have a power management mode of '0' (i.e. non-TXOP PS mode 130 shown in FIG. 1). As described above with reference to Table. 1, when the power management mode is '1', it may indicate that a corresponding terminal operates in the power saving mode. When the power saving mode is '0', it may indicate that the corresponding terminal operates in a mode excluding the power saving mode.

Table 2 shows group IDs of frames to be transmitted from an AP 500 to the terminals during the TXOP, and terminals that are members of a corresponding group. Table 2 shows information associated with a position of a corresponding terminal in a corresponding group.

TABLE 2

|  | Position 1 | Position 2 |
| --- | --- | --- |
| Group ID 1 | STA1, STA3, STA5 | STA2, STA4, STA6 |
| Group ID 2 | STA1, STA2 | STA3, STA4 |
| Group ID 3 | STA2, STA3 | STA4, STA5 |
| Group ID 4 | STA4, STA5 | STA6 |

Frame (1) 510 may include a group ID 511 of GID=1, a data field 513 with respect to the STA (1) 510 positioned in a position 1, and a data field 515 with respect to the STA (2) 502 positioned in a position 2. Referring to frame (1) 510, $N_{STS}=1, 1$, which in this example is used to indicate that there is data to be transmitted to two terminals included in the group ID 511 of frame (1) 510.

The STA (1) 501 and the STA (2) 502 may receive data of frame (1) 510, and transmit block acknowledgements (BAs) 591 and 592 in response to frame (1) 510. Referring to the data field 513 with respect to the STA (1) 501, more bit='0' and the STA(1) 501 operates in the power saving mode. Thus the third criterion is satisfied for the STA (1) 501 operating in power saving mode. Accordingly, STA (1) 501 may enter a sleep state after transmitting the BA 591. Referring to the data field 515 with respect to the STA (2) 502, more bit='1' and thus, STA (2) 502 operating in the power saving mode may maintain an awake state. In this example, 'more bit' corresponds to an MDB.

Frame (2) 530 may include a group ID 531 of GID=2, a data field 535 with respect to the STA (2) 502 positioned in the position 1, and a data field 533 with respect to the STA (3) positioned in the position 2. Referring to frame (2) 530, $N_{STS}=1, 1$, which in this example is used to indicate that data is to be transmitted to two terminals included in the group ID 531 of the frame (2) 530.

The STA (3) 503 and the STA (2) 502 may receive data of the frame (2) 530, and transmit BAs 593 and 595 in response to the frame (2) 530. Referring to the data field 533 with respect to the STA (3) 503, more bit='0' and the STA (3) 503 operates in the power saving mode. Thus the third criterion is satisfied for the STA (3) 503 operating in power saving mode. Accordingly, STA (3) 503 may enter the sleep state after transmitting the BA 595. Referring to the data field 535 with respect to the STA (2) 502, more bit='1' and thus, the STA (2) 502 operating in the power saving mode may maintain the awake state.

In this example, terminals, for example, the STA (4) 504, the STA (5) 505, and the STA (6) 506, not receiving a frame in the TXOP duration may be in an on state between frame transmission durations in order to verify whether a corresponding frame is transmitted to a one or more of the STA (4) 504, the STA (5) 505, and the STA (6) 506.

Frame (3) 550 may include a group ID 551 of GID=3, and a data field 553 with respect to the STA (2) 502 positioned included in the position 1. Referring to frame (3) 550, $N_{STS}=1, 0$, which in this example is used to indicate that there is data to be transmitted to a single terminal included in the group ID 551 of frame (3) 550. Referring to the data field 553 with respect to the STA (2) 502, more bit=0 and thus, the STA (2) 502 may receive corresponding data and transmit a BA 594 to the AP 500 and then, enter the sleep state.

The STA (4) 504 is positioned in the position 2 of the group ID 3. However, $N_{STS}=1, 0$ in the frame (3) 550. Accordingly, data to be transmitted to the STA (4) 504 is absent. In this example, a second criterion is satisfied.

Accordingly, the STA (4) 504 may enter the sleep state after receiving a preamble of frame (3) 550.

Frame (4) 570 may include a group ID 571 of GID=4, a data frame 575 with respect to the STA (5) 505 positioned in the position 1, and a data frame 573 with respect to the STA (6) 506 positioned in the position 2. Referring to frame (4) 570, $N_{STS}=1, 1$, which in this example is used to indicate that there is data to be transmitted to two terminals included in the group ID 571 of the frame (4) 570.

The STA (5) 505 and the STA (6) 506 may receive data of frame (4) 570, and transmit BAs 596 and 597 in response to frame (4) 570. Referring to the data field 573 with respect to the STA (6) 506, even though the more bit=0, the STA (6) 506 does not operate in the power saving mode. Accordingly, after transmitting the BA 597, the STA (6) 506 may still remain in the awake state.

Figure 6:
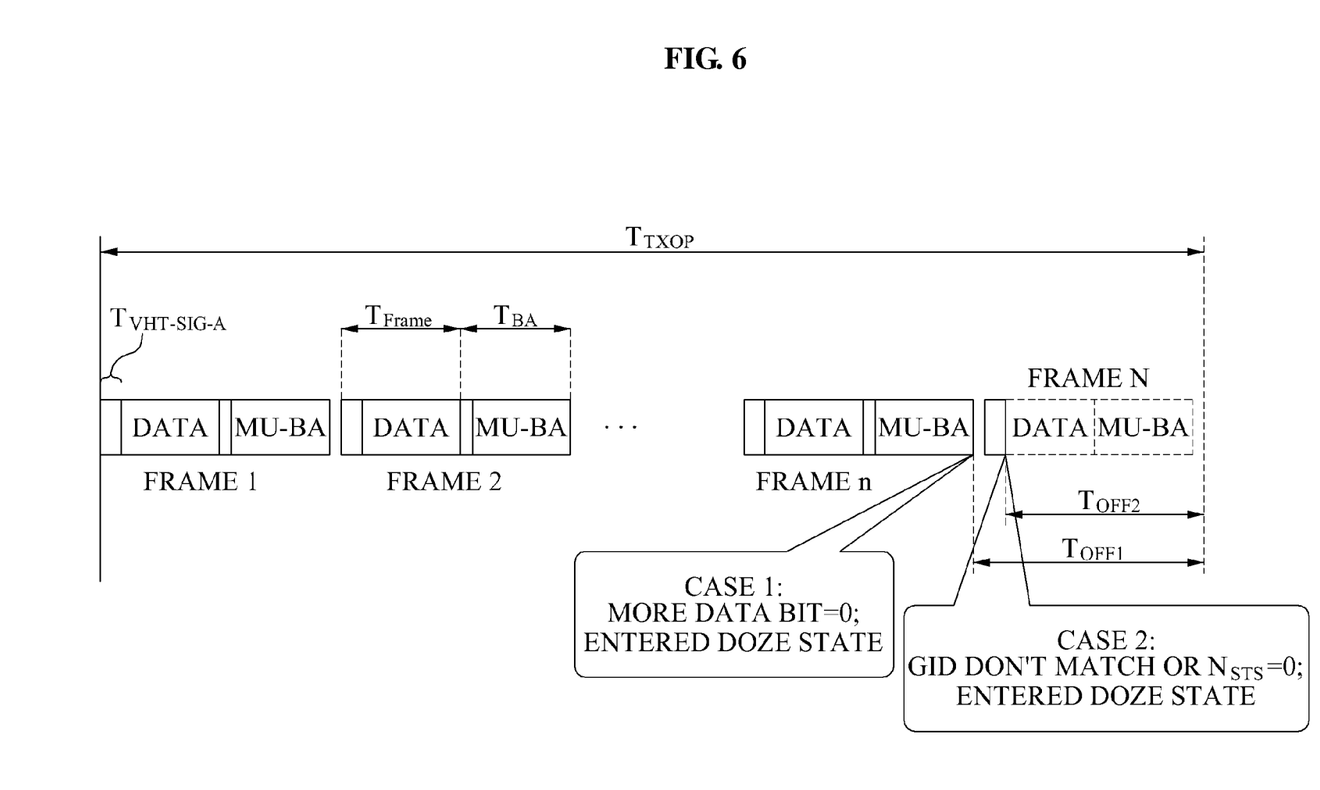
FIG. 6 is a diagram illustrating an example of a power saving rate when a predetermined criterion for power saving is satisfied.

FIG. 6 illustrates an example of a power saving rate when a predetermined criterion for power saving is satisfied.

Referring to FIG. 6, MU-BA may include a short interframe space (SIFS) and a BA from each of a plurality of terminals for each MU-BA phase. A single extra SIFS may be inserted between an end of the BA and a start of a subsequent frame.

$$\text{No. of frames}(N) \to N = \left\lfloor \frac{3.008 \text{ ms}}{T_{Frame} + T_{BA}} \right\rfloor \qquad \text{[Equation 1]}$$

In Equation 1, N corresponds to a number of frames that have a unit size available in 3.008 ms. $T_{Frame}$ corresponds to a frame duration and may have values of, for example, 0.5 ms, 1 ms, 1.5 ms, and the like. $T_{BA}$ corresponds to a duration of uplink MU-BA phase. $T_{BA}$ may be expressed by 4*(28 μs+SIFS)+1*SIFS.

$$T_{TXOP} = N*(T_{Frame} + T_{BA}) \qquad \text{[Equation 2]}$$

In Equation 2, $T_{TXOP}$ corresponds to the TXOP duration.

A power saving rate $PS_{TXOP}^{(1)}$ of a case in which the aforementioned third criterion is satisfied, that is, case 1 of FIG. 6 may be expressed by Equation 3.

$$PS_{TXOP}^{(1)} = \frac{T_{OFF1}}{T_{TXOP}} = \frac{T_{TXOP} - n*(T_{Frame} + T_{BA})}{T_{TXOP}} \quad \text{[Equation 3]}$$

In Equation 3, $T_{OFF}$ corresponds to a duration for a terminal in the power saving mode, and 'n' may have values from '0' to N, and corresponds to a number of frames that are to be transmitted to the terminal.

A power saving rate $PS_{TXOP}^{(2)}$ of a case in which the aforementioned first criterion and second criterion are satisfied, that is, case 2 of FIG. 6 may be expressed by Equation 4.

For example, Equation 4 expresses a power saving rate when a group ID indicates that a terminal is not a member of a corresponding group, or when the group ID indicates that the terminal is a member of the corresponding group, however, there is no data stream to be transmitted to the terminal from an access point during the TXOP. A case in which there is no data stream to be transmitted to the terminal from the access point during the TXOP may correspond to a case in which the $N_{STS}$ included in a VHT-SIG-A field of a frame is set to a value of '0'.

$$PS_{TXOP}^{(2)} = \frac{T_{OFF2}}{T_{TXOP}} = \frac{T_{TXOP} - n*(T_{Frame} + T_{BA}) - T_{VHT-SIG-A}}{T_{TXOP}} \quad \text{[Equation 4]}$$

In Equation 4, $T_{VHT\_SIG-A}$ corresponds to a time to decode VHT SIG-A=28 µs.

According to various aspects, when a data stream is not to be transmitted to a terminal operating in a power saving mode, it is possible to save power by maintaining an operation state of the terminal or setting an operation state of the terminal to a sleep state during a TXOP.

According to various aspects, when a terminal operating in a power saving mode satisfies a predetermined criterion, it is possible to decrease power consumption by changing an operation state of the terminal from an awake state to a sleep state.

The processes, functions, methods, and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and non-transitory computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method executed by a terminal in a wireless network comprising an access point and a plurality of terminals, the method comprising:
   receiving information from the access point during a transmission opportunity (TXOP) in which the access point simultaneously transmits, within a channel, data streams to a group of terminals intended to receive the data streams; and
   establishing an operational state of the terminal as one of an awake state and a sleep state based on the received information, wherein
   the received information comprises a group identifier (ID) of a group of terminals not intended to receive the transmitted data streams and an indication, differing from the group ID, of whether one of the data streams is to be received by the terminal during the TXOP.

2. The method of claim 1, wherein the received information further comprises an indication of completed transmission of the data stream to be received by the terminal during the TXOP.

3. The method of claim 2, wherein the sleep state is established when any of the following conditions is satisfied:
   the group ID indicates that the terminal is not intended to receive the transmitted data streams, the indication of whether one of the data streams is to be received by the terminal during the TXOP is negative, and the indication of completed reception for the data stream to be received by the terminal during the TXOP is affirmative.

4. The method of claim 1, further comprising:
receiving information associated with the TXOP duration from the access point.

5. The method of claim 1, further comprising:
transmitting information associated with the operational state of the terminal to the access point using a control field of a media access control (MAC) header.

6. The method of claim 1, further comprising: notifying the access point of information about whether the terminal has a capability of supporting a power saving mode.

7. The method of claim 1, wherein the sleep state is established if:
the group ID identifies a group to which the terminal belongs, or
the indication of whether one of the data streams is to be received by the terminal during the TXOP is negative.

8. A communication method executed by an access point in a wireless network comprising the access point and a plurality of terminals, the method comprising:
transmitting, during a transmission opportunity (TXOP) with respect to a channel, an indication of the TXOP duration, a group identifier (ID) of a group of terminals not intended to receive transmitted data streams from the access point, and an indication, differing from the group ID, of a particular terminal that is to receive one of the data streams during the TXOP; and
simultaneously transmitting the data streams to terminals not identified by the group ID and to the particular terminal.

9. The method of claim 8, further comprising:
transmitting, to the terminals, information about whether the access point is capable of supporting a power saving mode, and information associated with a support capability of the access point for the power saving mode.

10. The method of claim 8, further comprising:
generating a group of terminals based on information comprising a quality of service (QoS) between the terminals and a channel condition; and notifying the terminals of information associated with a member of the group.

11. The method of claim 8, further comprising:
regrouping the plurality of terminals and a predetermined terminal in response to the predetermined terminal notifying the access point that the predetermined terminal has entered a power saving mode.

12. The method of claim 8, further comprising:
in response to a predetermined terminal, of the group not intended to receive the data streams, entering a sleep mode, replacing, within the group, the predetermined terminal with another terminal based on data to be transmitted; and
notifying the predetermined terminal of information associated with a member of the group updated by the replacement.

13. The method of claim 12, further comprising buffering a data stream to be communicated to a terminal that has notified the access point that it has entered the sleep state of operation.

14. The method of claim 13, further comprising transmitting the buffered data stream to the terminal upon the terminal notifying the access point that it has changed its state from the sleep state to an active state.

15. The method of claim 8, further comprising transmitting, to each terminal receiving a data stream during the TXOP, information indicating whether an additional data stream is to be transmitted.

16. The method of claim 8, further comprising:
suspending transmission of a data stream to a terminal.

17. The method of claim 16, further comprising transmitting an indication to the terminal that transmission of the data stream is suspended for a remaining period of the TXOP.

18. A non-transitory computer-readable storage medium comprising program instructions to cause a computer to implement a method comprising:
receiving information from an access point during a transmission opportunity (TXOP) in which the access point simultaneously transmits, within a channel, data streams to a group of terminals intended to receive the data streams; and
establishing an operational state of a terminal as one of an awake state and a sleep state based on the received information received from the access point, wherein
the received information comprises a group identifier (ID) of a group not intended to receive the transmitted data streams and an indication, differing from the group ID, of whether one of the data streams is to be received by the terminal during the TXOP.

\* \* \* \* \*